United States Patent

Kmiec

[19]

[11] Patent Number: 5,538,229
[45] Date of Patent: Jul. 23, 1996

[54] ANTI-ROTATION APPARATUS FOR A VEHICLE SUSPENSION MEMBER

[75] Inventor: Daniel F. Kmiec, Birmingham, Mich.

[73] Assignee: Ford Motor Company, Dearborn, Mich.

[21] Appl. No.: 957,585

[22] Filed: Oct. 7, 1992

[51] Int. Cl.⁶ ............................. B60G 21/04; B25B 1/24
[52] U.S. Cl. ........................ 267/189; 267/279; 267/281; 280/690
[58] Field of Search ..................... 267/154, 189, 267/270, 273, 274, 276, 279, 281, 66, 67; 280/661, 663, 665, 689, 690, 725

[56] References Cited

U.S. PATENT DOCUMENTS

| | | |
|---|---|---|
| 2,300,844 | 11/1942 | Olley . |
| 2,626,797 | 1/1953 | Cuskie .................... 267/189 |
| 2,757,017 | 7/1956 | Matthias et al. .................. 280/690 |
| 2,852,269 | 9/1958 | Gaines .................... 267/189 X |
| 2,877,010 | 3/1959 | Gouirand . |
| 2,963,301 | 12/1960 | Rosenkrands . |
| 3,169,026 | 2/1965 | Soer . |
| 3,202,410 | 8/1965 | Schell . |
| 3,231,040 | 1/1966 | Blanchette . |
| 3,482,854 | 12/1969 | Masser . |
| 3,575,441 | 4/1971 | Arning et al. . |
| 4,002,327 | 1/1977 | Damon . |
| 4,267,896 | 5/1981 | Hendriksen . |
| 4,269,432 | 5/1981 | Inoue et al. ............................. 280/690 |
| 4,458,915 | 7/1984 | Emery . |
| 4,556,235 | 12/1985 | Giebel . |
| 4,575,114 | 3/1986 | Camp . |
| 4,759,567 | 7/1988 | Allen . |
| 4,764,677 | 5/1988 | Tanaka et al. . |

FOREIGN PATENT DOCUMENTS

| | | | |
|---|---|---|---|
| 602953 | 8/1960 | Canada ................................ 280/717 |
| 286073 | 10/1988 | European Pat. Off. ............... 280/690 |
| 126206 | 7/1983 | Japan ..................... 280/690 |
| 1515572 | 7/1978 | United Kingdom . |

Primary Examiner—Robert J. Oberleitner
Assistant Examiner—Kevin D. Rutherford
Attorney, Agent, or Firm—Gregory P. Brown; Roger L. May

[57] ABSTRACT

A suspension attachment apparatus is described suitable for use in a motor vehicle having an elongate suspension member interposed and connecting a sprung mass to an unsprung mass. The apparatus includes an isolator and a mechanism for fastening the suspension member to the sprung mass. The mechanism ensures proper orientation of the suspension member during the assembly process. Additionally, the mechanism simultaneously prevents rotation of the suspension member along its longitudinal axis relative to the isolator and prevents rotation of the isolator relative the sprung mass while isolating the sprung mass from vibrations of the unsprung mass.

12 Claims, 3 Drawing Sheets

5,538,229

ANTI-ROTATION APPARATUS FOR A VEHICLE SUSPENSION MEMBER

BACKGROUND OF THE INVENTION

1. Field of the Invention

This invention generally relates to suspension systems for motor vehicles. More specifically, the present invention relates to an anti-rotation apparatus for a vehicle suspension member on an independent wheel suspension for vehicles.

2. Disclosure Information

A typical independent suspension system for a front wheel drive automobile includes a tension strut for controlling longitudinal displacements of the wheel assembly relative to the vehicle chassis. Generally, the tension strut attaches to the chassis and the wheel support member using a compliant, vibration absorbing radial isolator. These isolators allow the tension strut to rotate about the longitudinal axis of the tension strut. Traditionally, designers did not have to prevent a standard straight tension strut from rotating. A tension strut design incorporating a single radius of curvature can provide more flexible packaging with neighboring components than a more straight tension strut. However, when a tension strut with a radius of curvature is allowed to rotate, it might not maintain adequate clearance to neighboring components. Furthermore, installation of a tension strut with a radius of curvature requires the tension strut to be oriented in a specific design position. If the strut is installed in a misoriented position, adequate clearance to neighboring components might not exist.

Using compliant assemblages for attaching suspension members to a vehicle chassis is well known. For example, U.K. patent no. 1,516,572 discloses a bush designed to prevent any sliding at an interface between a torsion bar and an inner diameter of a bushing. This design relies on a clamp that compresses the bush tightly around the circumference of the torsion bar. The effectiveness of this type of design at preventing rotation depends on the magnitude of the clamping load and the durometer of the elastomeric body. Therefore, due to the design's dependence on the durometer, tradeoffs must be made between the isolation provided and the anti-rotation capability of the design. Additionally, through the life of the vehicle there is no assurance that slipping will not occur since the durometer of the elastomeric body may change throughout the life of the vehicle. Finally, this design does not provide any solution to ensuring the installation of the tension strut in a predetermined orientation.

It would be desirable to provide an apparatus that would ensure consistent, accurate orientation during installation of the tension strut in a predetermined orientation. It would be further desirable to provide an apparatus that would ensure that the orientation of the tension strut will not change throughout the life of the vehicle.

SUMMARY OF THE INVENTION

According to the present invention, a suspension attachment apparatus is disclosed for use in a vehicle suspension having an elongate suspension member interposed and connecting a sprung mass to an unsprung mass. The suspension attachment apparatus comprises an isolator having a noncircular aperture therethrough configured to matingly engage the elongate suspension member in a predetermined orientation to prevent rotation of the elongate suspension member relative to the isolator. The suspension attachment apparatus further comprises fastening means for fastening the elongate suspension member to the sprung mass while simultaneously preventing rotation of the elongate suspension member along its longitudinal axis while isolating the sprung mass from vibrations of the unsprung mass.

An advantage of this system is simultaneously preventing rotation of a suspension member along its longitudinal axis while isolating said sprung mass from vibrations of said unsprung mass. Other advantages of the present invention will become apparent to those skilled in the art from the drawings, detailed description and claims which follow.

DETAILED DESCRIPTION OF THE PREFERRED EMBODIMENTS

Figure 1:
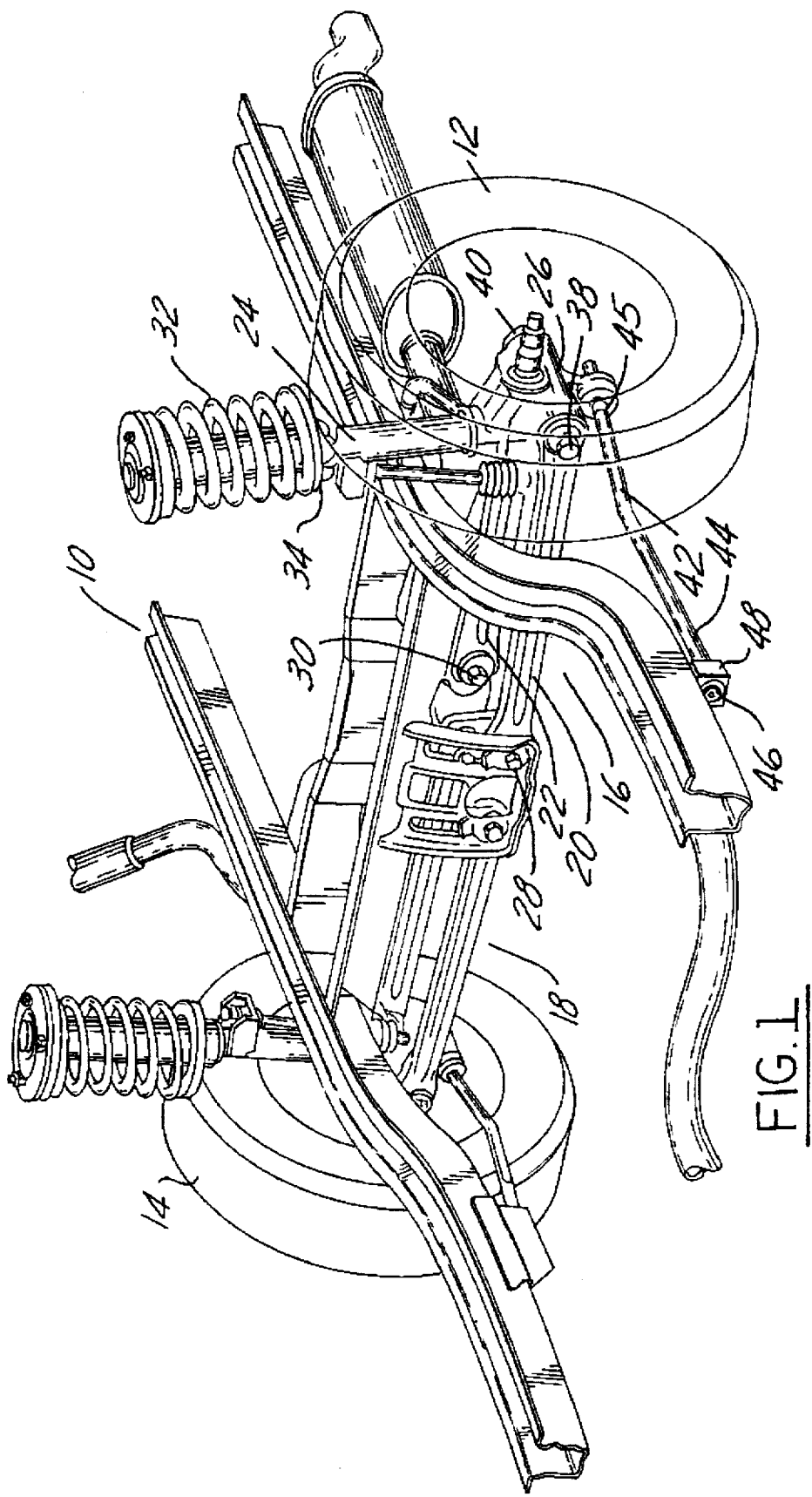
FIG. 1 is a perspective view of an independent rear wheel suspension for a motor vehicle.

Referring now to FIG. 1, a motor vehicle chassis (or unitized body and chassis) 10, also referred to as a sprung mass, includes left and right independent rear suspensions 16, 18, respectively, supporting left and right road wheels 12, 14. Each wheel suspension 16 and 18 is identical except that 6he is a mirror image of the other. Since each independent suspension is the same, reference will only be made to the left wheel suspension 16.

Generally, as shown in FIG. 1, the wheel suspension 16, also referred to as an unsprung mass, includes a front transverse control arm 20 having an inboard end 28 and an outboard end 38, a rear transverse control arm 22 having an inboard end 22 and an outboard end 40, and a telescopic damper 24 which connects a wheel support member 26 to the motor vehicle chassis 10. The pair of inboard ends 28, 30 are pivotably connected to the chassis 10 and the pair of outboard ends 38 and 40 are connected to the wheel support member 26. A coil spring 32, coaxially disposed on the telescopic damper 24 communicates the chassis 10 loads to the wheel support member through a lower spring seat 34.

The suspension 16 further includes a longitudinally disposed elongated suspension member, such as tension strut 42. Strut 42 limits the longitudinal displacements of the wheel support member 26 under dynamic loading, such as braking or accelerating and road impact forces. An isolator 45 resiliently mounts the tension strut 42 to the vehicle wheel support member 26 and an isolator 46 secures the forward end 44 of the tension strut to the chassis 10. The isolator 45 is vertically disposed on the bottom of the wheel support member 26 and longitudinally disposed between the outboard end 38 of the front control arm 20 and the outboard end 40 of the rear control arm 22.

Figure 2:
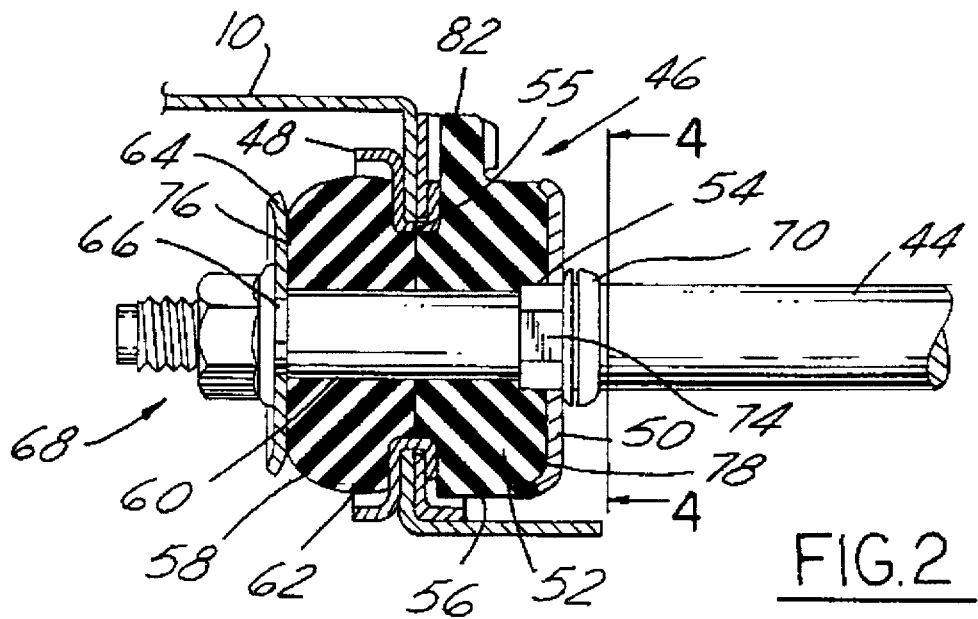
FIG. 2 is an plan, partially sectioned view of a tension strut isolator according to the present invention.
Figure 3:
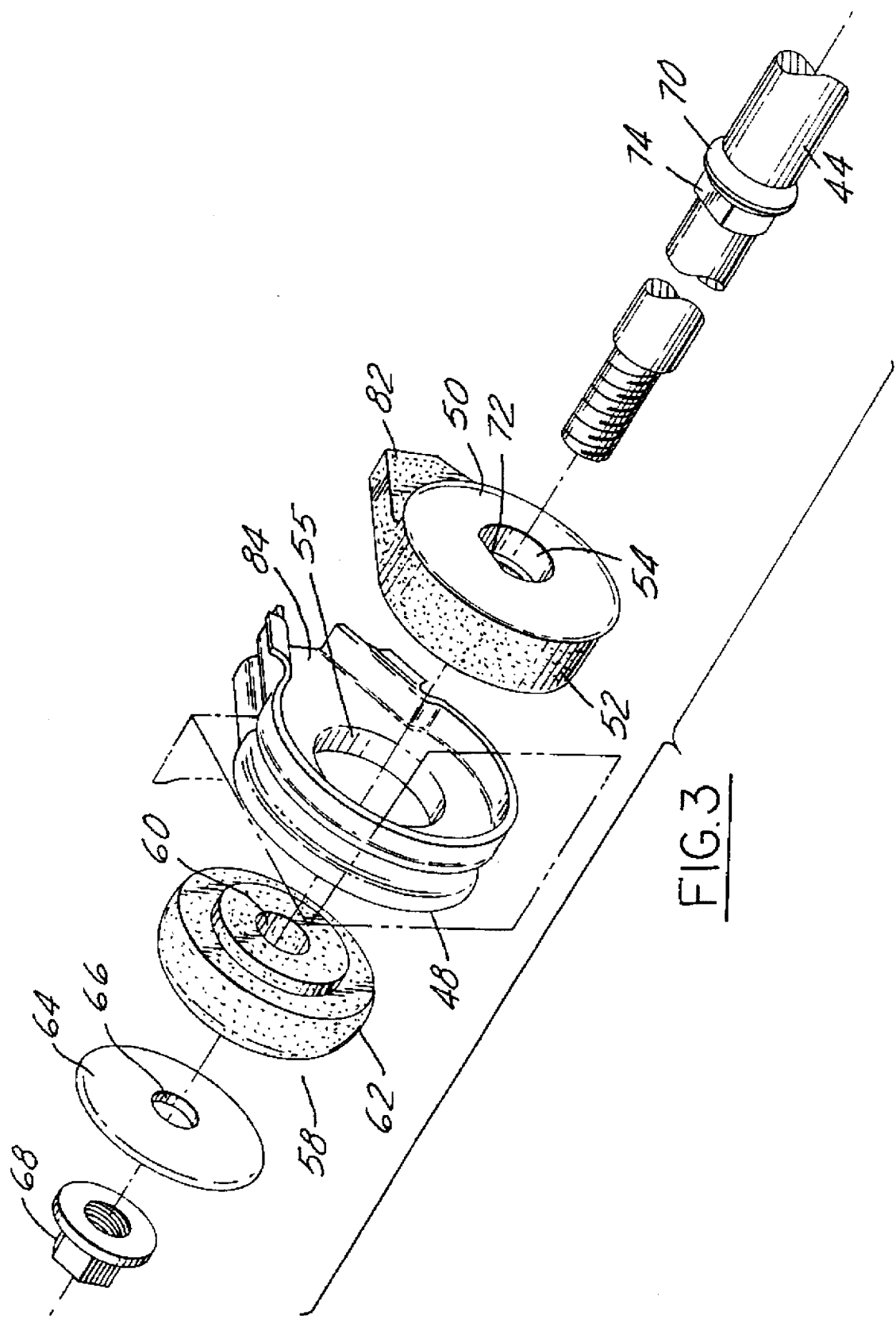
FIG. 3 is an exploded perspective view of the tension strut and isolator according to the present invention.

As shown in FIGS. 2–3, the forward end of the tension strut 44 is disposed within an isolator 46 clamped to a bracket 48 attached to the chassis 10. The isolator 46 includes a pair of generally cylindrical elastomeric bodies 52 and 58, each having a coaxial aperture disposed therethrough. The first body 52 has a stepped exterior surface 56 and includes a generally planar disk 50 bonded to a rear face 78 thereof. The disk 50 has an outer diameter generally equal to the larger diameter of the first body 52. The first body 52 and disk 50 both include coaxial, matching non-circular apertures 54 therethrough for mating engagement with the forward end 44 of the tension strut. A shoulder 70 circumferentially disposed on the forward end 44 of the tension strut contacts disk 50 to limit the axial displacement of the strut 42 relative to the isolator 46 as will be explained below.

The second body 58 of isolator 46 abuttingly engages the first body 52 and also includes a stepped exterior 62 and a circular aperture 60 therethrough coaxial with the non-circular apertures 54. In one embodiment, the non-circular apertures 54 comprise a D-shaped circle having a flat portion 72 thereon for matingly receiving a flat portion 74 formed on the forward end of the tension strut 44, just forward of the shoulder 70. The noncircular apertures 54 provides means for preventing rotation of the tension strut 42 relative to the isolator 46. It should be readily apparent to those skilled in the art that the indexing and anti-rotation function disclosed could be accomplished by many different shapes, including, but not limited to noncircular shapes, such as star or a non-equilateral triangle and even circular shapes, such as nonconcentric circular apertures.

A compression washer 64 having a circular aperture 66 therethrough is disposed adjacent to a forward face 76 of the second body 58. The circular aperture 66 is coaxial with the circular aperture 60. The outer diameter of the compression washer 64 is generally equal to the larger diameter of second body 58.

As explained above, the isolator 46 is disposed within bracket 48 attached to the vehicle chassis. As shown in FIGS. 2–3, the smaller diameter portion of the generally stepped exterior surfaces of the first 52 and second 58 bodies abuttingly contact when compressed to matingly engage a bracket aperture 55. Thus providing the retention means required to secure the tension strut 42 and isolator 46 to the chassis 10.

Figure 4:
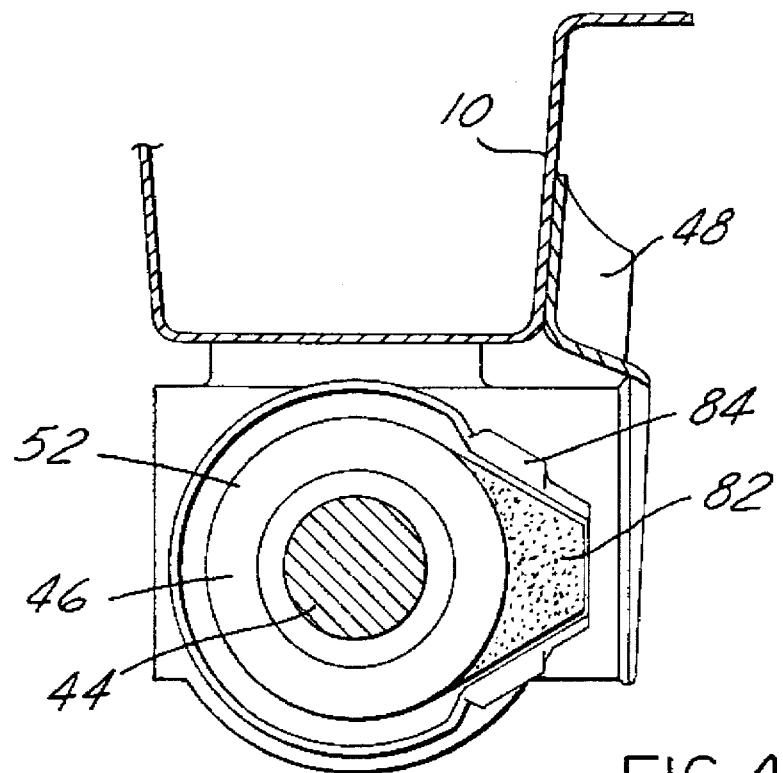
FIG. 4 is a cross-sectional view taken along line 4—4 of FIG. 2.

As shown in FIG. 4, the present invention also provides means for preventing rotation of the isolator 46 relative to the vehicle chassis 10. The first body 52 of isolator 46 includes a radially outwardly extending tang 82 disposed on the exterior surface thereof. The tang 82 matingly engages a receiver 84 integral in the bracket 48 in a predetermined orientation. Upon installation, the tang 82 cannot rotate within the receiver 84. In turn, this prevents rotation of the isolator 46 and the tension strut 42. The tang 82 has a predetermined length, width and thickness sufficient to resist shearing forces between the tang 82 and the first body 52 due to the torque applied to the first body 52 by the tension strut 42. It should readily be apparent to those skilled in the art that a variety of shapes would provide equivalent functionality of the present tang 82. Examples of alternative shapes include square tangs and triangular tangs. Similarly, the tang could be made from a variety of materials and bonded to the body, such as, but not limited to, a steel tang bonded to the isolator.

The first and second bodies 52 and 58 of isolator 46 are preferably formed by means of vulcanizing a certain predetermined rubber material to provide a resilient body for absorbing and isolating the chassis 10 from vibrations generated at the wheel support member 26. Vulcanization advantageously allows the disk 50 to be adhered on the rear surface 78 of the first body 52 simultaneously of the vulcanizing operation. It would also be acceptable to bond the disk 50 to the first body 52 after the vulcanizing operation using an adhesive. The disk 50, the compression washer 64 and the bracket 48 are all stamped from steel, however, this does not limit the variety of materials that would function equivalently. Plastics and composites as well as other metals including, but not limited to, aluminum could satisfactorily be substituted for steel.

The present invention is useful during the assembly of the vehicle as Well as throughout the entire life of the vehicle. During assembly, the operator slides the first body 52 over the forward end of the strut 44 until disk 50 contacts shoulder 70. The indexing feature of the present invention prevents this from occurring unless the flat portion 74 on the forward end of the tension strut 44 aligns with the flat portion 72 of the first body 52. This automatically orients the tang 82 in alignment for engagement with the receiver 84. Next, the operator inserts the forward end of the strut 44 into the bracket aperture 55 with the tang 82 simultaneously engaging the receiver 84. The operator then slides the second body 58 onto the strut end 44 followed by compression washer 66. The stepped cylindrical shape 56 and 62 of the first and second bodies 52 and 58 matingly engage bracket aperture 55. A clamping force secures the isolator 46 to the bracket 48 by compressing the first and second bodies 52 and 58 about the perimeter of the bracket aperture 55. The clamping force is generated when the operator tightens the threaded rod fastener 68, which forces the isolator 46 against the radially extending shoulder 70.

In operation, dynamic loading of the tension strut 42 applies a moment to the isolator 46. The flat portion 72 on the first body 52 and the disk 50 prevents the moment from changing the orientation of the tension strut 42 relative to the isolator 46. This imparts an equal and opposite moment on the isolator 46 resisted by the tang 82 in the receiver 84, thus preventing the isolator 46 from rotating within the bracket aperture 55. In combination, the two act to prevent the tension strut 42 from rotating relative to the chassis 10.

The foregoing description presents one embodiment of this invention. Details of construction have been shown and described for purposes of illustration rather than limitation. Modifications and alterations of the invention may occur to those skilled in the art that will come within the scope and spirit of the following claims.

We claim:

1. A suspension attachment apparatus for use in a vehicle suspension having an elongate suspension member interposed and connecting a chassis to an unsprung mass, said suspension attachment apparatus comprising:

an isolator including a first elastomeric body having a generally planar disk bonded to a rear surface thereof, said disk and said first elastomeric body having axially aligned apertures therethrough, said isolator further comprising a second elastomeric body having an aperture therethrough axially aligned with said apertures in said first elastomeric body and said disk;

attachment means disposed on said apertures in said first elastomeric body and said disk, said attachment means being configured to matingly engage said elongate suspension member in a predetermined orientation to prevent rotation of said elongate suspension member relative to said isolator; and fastening means for fastening said elongate suspension member to said chassis while simultaneously preventing rotation of said elongate suspension member along its longitudinal axis while isolating said chassis from vibrations of said unsprung mass.

2. A suspension attachment apparatus according to claim 1, wherein said fastening means comprises a bracket secured to said chassis, said bracket including a receiver adapted to matingly receive said first elastomeric body therein and prevent rotation of said first elastomeric body relative to said chassis.

3. A suspension attachment apparatus according to claim 2, wherein said first elastomeric body includes a tang projecting from the circumference thereof, said tang being configured to matingly engage said receiver and prevent rotation of said first elastomeric body relative to said bracket.

4. A suspension attachment apparatus according to claim 1, wherein said attachment means comprises a flat portion disposed on an internal circumference of said apertures of said first elastomeric body and said disk comprise an internal circumference having at least one flat portion thereon.

5. A suspension attachment apparatus system for a vehicle comprising:

a chassis;

a wheel support member;

an upwardly extending telescopic damper having a lower end secured to said wheel support member and an upper end connected to said chassis;

transversely extending front and rear control arms, each of said control arms having an inboard end pivotably connected to said chassis and an outboard end connected to said wheel support member;

an elongate tension strut having a forward end attached to said chassis and a rearward end connected to said wheel support member; and isolation means for isolating the chassis from vibrations of said wheel support member and fastening said tension strut to said chassis in a predetermined orientation while simultaneously preventing rotation of said tension strut about its longitudinal axis.

6. A suspension attachment apparatus according to claim 5, wherein said isolation means comprises:

an isolator having a noncircular aperture therethrough configured to matingly engage said tension strut to prevent rotation of said tension strut relative to said isolator; and fastening means for fastening said tension strut to said chassis, said fastening means being operative to prevent rotation of said isolator relative to said chassis.

7. A suspension attachment apparatus according to claim 6, wherein said isolator further comprises a first elastomeric body having a generally planar disk bonded to a rear surface thereof, said disk and said first elastomeric body having axially aligned non-circular apertures therethrough, said isolator further comprising a second elastomeric body having an aperture therethrough , axially aligned with said apertures in said first elastomeric body and said disk.

8. A suspension attachment apparatus according to claim 7, wherein said fastening means comprises a bracket secured to said chassis, said bracket including a receiver adapted to matingly engage said first elastomeric body and prevent rotation of said first elastomeric body relative to said chassis.

9. A suspension attachment apparatus according to claim 8, wherein said first elastomeric body includes a tang projecting from the circumference of said first elastomeric body and is configured to matingly engage said receiver and prevent rotation of said first elastomeric body relative to said bracket.

10. A suspension attachment apparatus according to claim 7, wherein said non-circular apertures of said first elastomeric body and said disk comprise an internal circumference having at least one flat portion thereon.

11. A suspension attachment apparatus according to claim 6, further comprises a shoulder disposed on said tension strut, said shoulder being configured to contact a shoulder disposed on said tension strut to limit axial insertion of said tension strut into said isolator.

12. A suspension attachment apparatus according to claim 5, wherein said tension strut includes a single predetermined radius of curvature disposed at a predetermined location.

\* \* \* \* \*